United States Patent Office 2,698,329
Patented Dec. 28, 1954

2,698,329
TRIMETHYLENEDIOXYBENZENE AND CERTAIN DERIVATIVES THEREOF

Ralph B. Thompson, Hinsdale, Ill., assignor to Universal Oil Products Company, Chicago, Ill., a corporation of Delaware No Drawing. Application December 21, 1950,
Serial No. 202,141

6 Claims. (Cl. 260—340.3)

This invention relates to new heterocyclic compounds and to a process for producing said heterocyclic compounds and particularly to the production of compounds containing an aryl ring and a seven-membered oxygen-containing ring combined therewith.

An object of this invention is a trimethylenedioxyaryl compound and a process for producing it.

Another object of this invention is a trimethylenedioxybenzene compound.

Still another object of this invention is a trimethylenedioxybenzene.

A further object of this invention is 4-nitro-1,2-trimethylenedioxybenzene.

An additional object of this invention is 4-amino-1,2-trimethylenedioxybenzene.

A still additional object of this invention is 4-hydroxy-1,2-trimethylenedioxybenzene.

A still further object of this invention is 2-tertiary-butyl-4,5-trimethylenedioxyphenol.

One embodiment of this invention relates to a trimethylenedioxyaryl compound formed by reacting an ortho dihydroxy aromatic compound and a trimethylene halide in the presence of an alkaline material, preferably at high dilution.

Another embodiment of this invention is a trimethylenedioxybenzene compound represented by the formula:

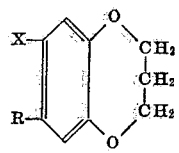

wherein X is selected from the members of the group consisting of a hydrogen atom, a hydroxyl group, a nitro group, and an amino group and R is a member selected from the group consisting of hydrogen and an alkyl group.

A further embodiment of this invention relates to a process for producing 1,2-trimethylenedioxybenzene which comprises reacting a catechol and trimethylene bromide in the presence of a base, and recovering the resultant 1,2-trimethylenedioxybenzene.

This invention relates to new compositions of matter and to processes which are used to synthesize said new compounds. These compounds are trimethylenedioxyaryl compounds and they are formed by reacting a trimethylene halide, particularly trimethylene bromide or trimethylene chloride, with an ortho dihydroxyaryl compound, particularly ortho-dihydroxybenzene, and alkylated ortho-dihydroxybenzene or an ortho-dihydroxynaphthalene. Catechols and alkylated catechols are representative of the ortho-dihydroxybenzenes that are used as starting materials in this process.

The reaction between catechol itself and trimethylenebromide in the presence of an alkaline material as sodium methylate to produce trimethylenedioxybenzene is represented by the equation:

(1)
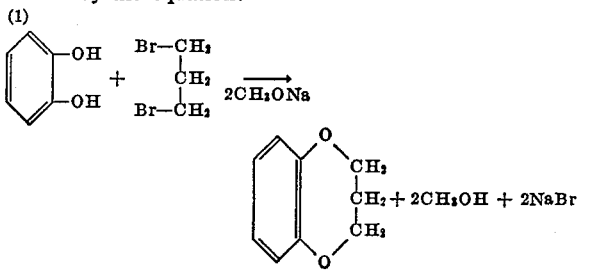

The process is also useful in producing substituted trimethylenedioxybenzene compounds of the formula:

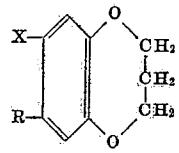

wherein X represents a member selected from the group consisting of a hydrogen atom, a hydroxyl group, a nitro group, and an amino group and R represents a member selected from the group consisting of a hydrogen atom and an alkyl group. These substituted trimethylenedioxybenzene compounds may be formed from the corresponding subtituted benzene or they may be produced from the trimethylenedioxybenzene by a series of nitration, reduction, diazotization, hydrolysis and alkylation reactions as will be further evident from the examples of this application. This series of conversion reactions may be represented as follows starting with the trimethylenedioxybenzene:

(2)
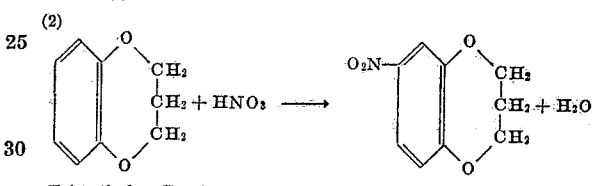

Trimethylenedioxybenzene      4-nitro-1,2-trimethylene-
                                dioxybenzene (3)
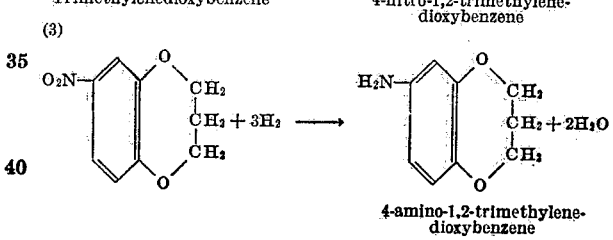

4-amino-1,2-trimethylene-
dioxybenzene (4)
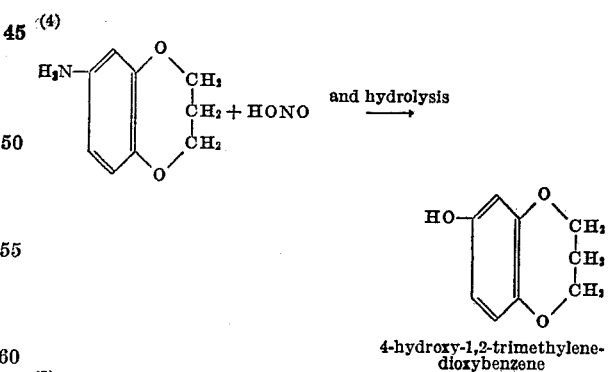

4-hydroxy-1,2-trimethylene-
dioxybenzene (5)
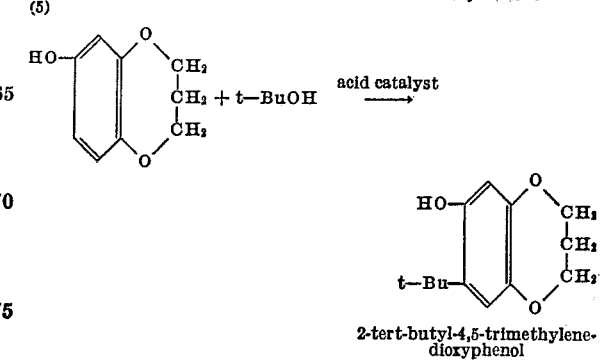

2-tert-butyl-4,5-trimethylene-
dioxyphenol

The trimethylenedioxyaryl compounds and particularly the trimethylenedioxybenzene compounds formed by this process are useful as organic intermediates for the production of medicinals, oxidation inhibitors, and the like. Thus the above-indicated 2-tertiary-butyl-4,5-trimethylenedioxyphenol inhibited the oxidative deterioration of a Pennsylvania gasoline to which 0.02% by weight of this compound was added. It was also effective in enhancing the stability of an unstable lard, by preventing the lard from becoming rancid for a longer time than in its absence.

The nature of this invention is illustrated further by the following examples which are given with no intention of limiting unduly its generally broad scope.

*Example I*

*Trimethylenedioxybenzene.*—Catechol (66 g., 0.6 mole), trimethylenedibromide (112 g.), and sodium methylate (68 g.) dissolved in 1.5 liter of methanol were sealed in a bomb and heated at 120° C. for five hours. Most of the alcohol was evaporated and the residue after dilution with water was extracted with a mixture of ether-petroleum ether, the solvent evaporated and the trimethylenedioxybenzene distilled in vacuo, yield: 19 grams, melting point, 14–15° C. and boiling point, 110–114° at a pressure of 18 mm.

*Example II*

*4-nitro-1,2-trimethylenedioxybenzene.*—Trimethylenedioxybenzene (17 g.) was dissolved in glacial acetic acid (50 cc.). With cooling and stirring nitric acid (10 g., D-1.42) in acetic acid (15 g.) was added slowly. Upon cooling in ice the 4-nitro-1,2-trimethylenedioxybenzene crystallized and was separated by filtration. This compound had a melting point of 106–107° C.

*Example III*

*4-amino-1,2-trimethylenedioxybenzene.*—4-nitro-1,2-trimethylenedioxybenzene (20 g.) was suspended in methanol (100 cc.) and reduced with hydrogen at about 60 p. s. i. g. using 5 g. of reduced nickel-diatomaceous earth catalyst containing 60% by weight of nickel. The catalyst was removed by filtration, the solvent evaporated, and the product distilled in vacuo to separate 4-amino-1,2-trimethylenedioxybenzene melting at 72–75° C. and boiling at 105–110° C. at a pressure of 1 mm.

*Example IV*

*4-hydroxy-1,2-trimethylenedioxybenzene.*—4-amino-1,2-trimethylenedioxybenzene (24 g.) was dissolved in water (250 cc.) containing sulfuric acid (25 g. of 95%). The solution was cooled to 0–5° C. and a solution of sodium nitrite (9.2 g.) in water (50 cc.) added with vigorous stirring. The diazonium salt solution was added slowly to a boiling solution of copper sulfate (saturated at 30° C.) with vigorous stirring. The solution was cooled, extracted with ether, the solvent evaporated, and the residue distilled in vacuo. After crystallization from ether-petroleum ether the product melted at 94–95° C., boiled at 122–125° C. at a pressure of 0.25 mm. and was identified as 4-hydroxy-1,2-trimethylenedioxybenzene.

*Example V*

*2-tert-butyl-4,5-trimethylenedioxyphenol.*—To a mixture of 5 g. of 4-hydroxy-1,2-methylenedioxybenzene in phosphoric acid (50 g. of 85%) containing acetic anhydride (2.5 cc.) and glacial acetic acid (2.5 cc.) at 70–80° C. was added slowly with stirring tert-butyl alcohol (5 g.). The solid butylation product separated after a short interval; it was extracted with ether-petroleum ether after adding water and crystallized from this solvent. The resultant 4-tert-butyl-4,5-trimethylenedioxyphenol melted at 133–135° C.

I claim as my invention:

1. A trimethylenedioxybenzene compound represented by the formula:

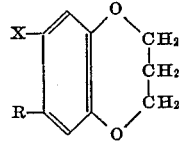

wherein X represents a member selected from the group consisting of a hydrogen atom, a nitro group, an amino group and a hydroxyl group, and R represents a member selected from the group consisting of a hydrogen atom and an alkyl group.

2. 1,2-trimethylenedioxybenzene.
3. 4-nitro-1,2-trimethylenedioxybenzene.
4. 4-amino-1,2-trimethylenedioxybenzene.
5. 4-hydroxy-1,2-trimethylenedioxybenzene.
6. 2-tert-butyl-4,5-trimethylenedioxyphenol.

References Cited in the file of this patent

Kohn et al., Monatsh f. Chem., vol. 43, pp. 545–57 (1923).

Kohn et al., Chem. Abstracts, vol. 17, p. 1448 (1923).